(12) United States Patent
Groben et al.

(10) Patent No.: US 12,146,680 B2
(45) Date of Patent: Nov. 19, 2024

(54) DEVICE FOR MANIPULATING AN ACTUATOR, DESIGNED IN PARTICULAR IN THE FORM OF A THROTTLE FLAP OR CLOSURE FLAP, OF AN AIR VENT

(71) Applicant: ILLINOIS TOOL WORKS INC., Glenview, IL (US)

(72) Inventors: Manfred Groben, Gau-Bickelheim (DE); Markus Englert, Homburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 525 days.

(21) Appl. No.: 17/426,964

(22) PCT Filed: Jan. 13, 2020

(86) PCT No.: PCT/US2020/013266
§ 371 (c)(1),
(2) Date: Jul. 29, 2021

(87) PCT Pub. No.: WO2020/163039
PCT Pub. Date: Aug. 13, 2020

(65) Prior Publication Data
US 2022/0099332 A1 Mar. 31, 2022

(30) Foreign Application Priority Data
Feb. 5, 2019 (DE) ...................... 10 2019 102 826.4

(51) Int. Cl.
*F24F 13/14* (2006.01)
*B60H 1/34* (2006.01)
*F24F 13/06* (2006.01)

(52) U.S. Cl.
CPC ........... *F24F 13/1426* (2013.01); *B60H 1/34* (2013.01); *F24F 13/06* (2013.01);
(Continued)

(58) Field of Classification Search
CPC .............. B60H 1/34; B60H 2001/3478; F24F 13/1426; F24F 13/06
(Continued)

(56) References Cited

U.S. PATENT DOCUMENTS

| 4,676,146 A | 6/1987 | Takahashi |
| 5,441,451 A | 8/1995 | Jeung |

(Continued)

FOREIGN PATENT DOCUMENTS

| DE | 4424904 A1 | 1/1995 |
| DE | 4327265 A1 | 2/1995 |

(Continued)

OTHER PUBLICATIONS

PCT, International Search Report and Written Opinion, International Application No. PCT/US2020/013266; date of mailing May 6, 2020, 10 pages.

*Primary Examiner* — Allen R. B. Schult
(74) *Attorney, Agent, or Firm* — THOMPSON HINE LLP

(57) ABSTRACT

A device for manipulating an actuator (1) of an air vent (2), wherein, for generating as required an adjustment movement acting on the actuator (1), the device has a preferably manually actuable actuating element (3) and a drive mechanism (6) with a motor drive (7). The drive mechanism (6) is assigned a resetting mechanism which is designed to make an adjustment movement, brought about previously by the drive (7), of the actuator (1) relative to the housing (10) of the air vent (2) reversible again, if required, such that the actuator (1) is then again in a position relative to the housing (10) of the air vent (2) that was set previously by actuation of the actuating element (3).

15 Claims, 5 Drawing Sheets

(52) U.S. Cl.
CPC ................ *B60H 2001/3478* (2013.01); *F24F 2013/1433* (2013.01); *F24F 2013/1446* (2013.01); *F24F 2013/1473* (2013.01)

(58) Field of Classification Search
USPC ........................................................ 454/143
See application file for complete search history.

(56) References Cited

U.S. PATENT DOCUMENTS

| | | |
|---|---|---|
| 2008/0220711 A1 | 9/2008 | Banschbach |
| 2018/0170149 A1 | 6/2018 | Fidh |

FOREIGN PATENT DOCUMENTS

| | | |
|---|---|---|
| DE | 19935549 A1 | 11/2000 |
| DE | 10355247 A1 | 6/2005 |
| DE | 102006010388 A1 | 9/2007 |
| DE | 102015101101 B3 | 7/2016 |
| DE | 102016105003 A1 | 9/2016 |
| EP | 1829722 A1 | 9/2007 | under the headings of the 1. $c$ is more of the 1. $c$ is more of the
DEVICE FOR MANIPULATING AN ACTUATOR, DESIGNED IN PARTICULAR IN THE FORM OF A THROTTLE FLAP OR CLOSURE FLAP, OF AN AIR VENT

TECHNICAL FIELD

The present invention relates to a device for manipulating an actuator, designed in particular in the form of a throttle flap or closure flap, of an air vent, and to a corresponding air vent, in particular for a ventilation system of a vehicle. Furthermore, the invention relates to a ventilation system with an air vent of this type.

BACKGROUND

In the case of ventilation devices for vehicles, air vents or air outlet nozzles are generally used which make a targeted control of the exiting air jet possible. Air vents of this type serve to feed, in particular, fresh air into a vehicle interior compartment.

Here, the air stream flows via an inlet opening of the air vent into an air duct which is delimited by way of the housing wall of the air vent, flows through said air duct, and finally flows through the outlet opening of the air vent into the interior compartment of a vehicle (for example, passenger car or truck). The air quantity which flows per unit time into the interior compartment of the vehicle via the air vent can as a rule be controlled via an actuator which is provided in the air duct of the air vent such that it can be adjusted and is configured, for example, as a throttle flap or closure flap. The actuator can optionally also be configured as an air guiding element or as part of a package of air guiding elements.

Actuators of this type (fan flaps, closure flaps or throttle flaps) are usually set individually by hand. Here, not only a distribution of the air stream which enters into the interior compartment of the vehicle to the footwell, to the middle height in the motor vehicle or for defrosting to the windshield is possible; rather, it is often also possible for actuators of this type to be adjusted, in order for it to be possible for the proportion of the air which flows in in a fresh state or the air which is cooled by way of a cooling unit and the circulating air quantity to be changed for temperature regulation.

Although said solutions which are known from the prior art for the manual adjustment of an actuator which is assigned to an air vent can also be used in the case of electric vehicles or hybrid vehicles, further aspects have to be taken into consideration in the case of vehicle types of this type. In the case of electric vehicles or hybrid vehicles, propulsive power is generated completely or partially by way of an electric motor. Therefore, by way of the electric motor, either the entire power which is required for a movement of the vehicle (electric vehicle) is provided, or a part of the power which is required for the locomotion of the vehicle is provided, in order thus to unburden an internal combustion engine as main drive (hybrid vehicle).

The solutions for interior compartment ventilation which are used in the case of classic vehicles which have only an internal combustion engine as drive system can be applied only partially in the case of electric or hybrid vehicles, since the storage of electric energy represents a great challenge in the case of said vehicle types. On account of the fact that the storage capacities of known energy stores are limited, electric or hybrid vehicles have to make economic use of the stored electric energy, in order to make relatively great ranges possible. The aim in the case of electric or hybrid vehicles is thus to switch off or to deactivate all electric consumers in as automatic a manner as possible when they are not directly required. This also relates, in particular, to the climate control or ventilation of the vehicle interior compartment.

Saving of energy can be achieved, in particular, if the quantity of air which is to be heated or to be cooled electrically per unit time is reduced, to be precise by only those air vents for the ventilation and/or climate control of the vehicle interior compartment being activated which are installed in the immediate vicinity of the vehicle occupant, whereas, in contrast, those air vents which serve, for example, for the climate control/ventilation in the region of a front passenger seat are deactivated automatically as soon as it is detected that the front passenger seat is not occupied.

In order to solve this problem, it would be fundamentally conceivable to provide a motorized adjustment or regulation of the actuator, for example, for the air outlet flaps which are arranged in the front passenger space. The actuator of the air vent might then be closed automatically by way of the motorized adjustment, as soon as it is detected, for example with the aid of a corresponding sensor system, that the front passenger seat is not occupied.

The use of a motorized adjustment of this type has disadvantages, however, with regard to the comfort of the vehicle occupants. If the front passenger seat is namely occupied again at a later time, the front passenger has to reset the actuator again manually each time, in order to set the air quantity, ventilation direction and/or temperature which is desired for the front passenger. Said manual setting is reset again, however, as soon as the actuator is closed via the motorized adjustment.

SUMMARY

The invention is thus based on the object of specifying a device for manipulating an actuator, designed in particular in the form of a throttle or closure flap, of an air vent for a vehicle, which device makes considerable saving of energy resources possible during operation of the vehicle, without the comfort of the vehicle occupants being influenced in a negative manner.

Furthermore, an air vent, in particular for a ventilation system of a vehicle, and a ventilation system with an air vent of this type are to be specified, the air vent and/or the ventilation system making considerable saving of energy resources possible during operation of the vehicle, without the comfort of the vehicle occupants being influenced in a negative manner.

With regard to the device for manipulating an actuator, designed in particular in the form of a throttle or closure flap, of an air vent, the object on which the invention is based is achieved according to the invention by way of the subject matter of independent patent claim 1, advantageous developments of the device according to the invention being specified in dependent claims 2 to 14.

With regard to the ventilation system according to the invention, the object on which the invention is based is achieved according to the invention by way of the subject matter of further independent patent claim 15.

Accordingly, the invention relates, in particular, to a device for manipulating an actuator, designed in particular in the form of a throttle flap or closure flap, of an air vent. The actuator of the air vent which is manipulated with the aid of the device according to the invention can be designed optionally to this end as an air guiding element or as part of a package of air guiding elements.

The device according to the invention for manipulating the actuator of the air vent is distinguished, in particular, by virtue of the fact that the actuator (such as, for example, a closure flap in an air vent) can be operated via a preferably manually actuable actuator element (such as an adjusting wheel, rotary wheel or slide element), wherein an electronic actuation or manipulation of the actuator is also possible in addition to this with the aid of a motor drive (such as an electric motor drive). Therefore, a combination of a preferably manually actuable actuating element firstly and a drive mechanism with a motor drive (in particular an electric motor drive) secondly is proposed, in order for it to be possible for the actuator of the air vent to be manipulated as required, the device preferably being integrated into the air vent in such a way that the air vent is identical in haptic terms with conventional air vent systems visually and with regard to the preferably manually actuable actuating element.

One essential aspect of the device according to the invention for manipulating the actuator of the air vent is to be seen in the fact that a resetting mechanism is provided which allows it to be possible for a position of the actuator which was originally set with the aid of the preferably manually actuable actuating element and which was subsequently adjusted by way of the motor drive of the drive mechanism to be re-established or moved to again automatically.

Therefore, a combined manual and electric actuation or manipulation of the actuator in the air vent is possible, wherein the actuator which is, for example, closed temporarily electronically, that is to say by way of actuation of the motor drive, moves back again afterward into the starting position. In this context, "starting position" means that position of the actuator relative to the housing of the air vent which was set with the aid of the preferably manually actuated actuating element before the actuation of the motor drive.

In this way, for example, the quantity of the air which is to be heated or cooled per unit time can be minimized, as a consequence of which energy can be saved, which has a positive effect, in particular, when the invention is used in the case of one or more air vents in an electric vehicle.

In other words, the present invention relates to an actuator (for example, closure flap) which can be actuated, in particular, manually and, as required, can be closed by a control unit with the aid of the motor drive, wherein the resetting mechanism of the device according to the invention allows the actuator to subsequently return again into the old position, that is to say into the position which is set with the aid of the manually actuable actuating element, and wherein, furthermore, it is possible for said actuator to be manipulated or adjusted, in particular, manually via the preferably manually actuable actuating element.

To this end, the abovementioned resetting mechanism which is assigned, in particular, to the drive mechanism of the device according to the invention is designed to make an adjustment movement, brought about previously by the motor drive, of the actuator relative to the housing of the air vent reversible again, if required, such that the actuator is then again in a position relative to the housing of the air vent that was set previously by actuation of the actuating element.

The resetting mechanism which is assigned, in particular, to the drive mechanism is a (mechanical) system which adds (that is to say, superimposes) an adjustment movement which is brought about upon actuation of the preferably manually actuable actuating element and acts on the actuator to be manipulated to an adjustment movement which is generated in the case of actuation of the motor drive of the drive mechanism and acts on the actuator. It is provided here that the preferably manually actuable actuating element is held in place during the movement of the motor drive.

By way of the device according to the invention, the actuator of the air vent or the actuator in the air vent can be operated manually in a usual way by the operator, and the operation and the visual appearance of the air vent and, in particular, the device for manipulating the actuator of the air vent do not differ discernibly from an air vent or a device for manipulating an actuator of an air vent, in the case of which the actuator can be actuated merely in a purely manual manner.

According to embodiments of the invention, the actuator of the air vent is adjustable relative to the housing of the air vent between a first extreme position, in which, for example, an air duct of the air vent is (completely) open, and a second extreme position, in which, for example, the air duct of the air vent is (completely) blocked by the actuator. Here, the preferably manually actuable actuating element is designed, in particular, to set the actuator of the air vent as desired between the first and second extreme position. Therefore, there is still a purely manual operating capability for manipulating the actuator of the air vent by way of the device according to the invention.

It is provided in one development of the abovementioned embodiment that the drive is assigned a drive element which is movable between a first position and a second position. The first position of the drive element is preferably defined by way of a first stop. According to embodiments of the device according to the invention, the second position does not have to be predefined fixedly: rather, it depends, in particular, on the position of the preferably manually actuable actuating element, to be precise, in particular, on the instantaneous position of the actuating element at the time of the actuation of the drive.

The first and second position which can be assumed by the drive element of the motor drive are correlated, in particular, firstly with a previously fixed or fixable position of the actuator relative to the housing of the air vent, and secondly with the instantaneous position of the preferably manually actuable actuating element or that position of the actuator relative to the housing of the air vent which is set via said instantaneous position of the actuating element.

It is thus conceivable, for example, that, when the drive element is in its second position by way of actuation of the motor drive, the actuator of the air vent is in its second extreme position, such as in the extreme position, for example, in which the air duct of the air vent is completely closed by way of the actuator.

Secondly, in a state when the drive element of the electric motor drive is in its first position, that is to say in the position which is preferably defined by way of the first stop, the actuator of the air vent can again be in a position relative to the housing of the air vent, which position has previously been set by way of the actuation of the preferably manually actuable actuating element.

The resetting mechanism which is assigned to the drive mechanism serves to add adjustment movements which are generated firstly by way of actuation of the actuating element and secondly by way of actuation of the motor drive. Furthermore, the resetting mechanism is given the additional functionality of reversing the adjustment movement which is generated by way of actuation of the electric motor drive, as required.

Various (mechanical) embodiments may be suitable for realizing a resetting mechanism of this type.

According to one exemplary embodiment, the resetting mechanism has a toggle lever system. As an alternative to this, however, it is also conceivable if the resetting mechanism has a planetary gearing or differential gearing instead of a toggle lever system.

According to a further aspect of the present invention, said invention relates, in particular, to a device for manipulating an actuator, designed in particular in the form of a throttle flap or closure flap, of an air vent, the device having an actuating mechanism with a preferably manually actuable actuating element which is assigned a lever arm, in order to generate an adjustment movement which acts on the actuator to be manipulated of the air vent, as required. In addition to the actuating mechanism with the preferably manually actuable actuating element, the device according to the invention has a drive mechanism with a motor drive, in particular an electric motor drive, which is assigned a drive element, in order to generate an adjustment movement which acts on the actuator to be manipulated of the air vent, as required.

The actuator of the air vent can selectively be manipulated manually or by motor by way of the provision of a first device for generating an adjustment movement as required, said first device being designed in the form of an actuating mechanism with a preferably manually actuable actuating element, and by way of the provision of a further (second) device for generating an adjustment movement as required in the form of a drive mechanism with a motor drive. This makes it possible that the corresponding actuator of the air vent can be manipulated even when the vehicle occupant, such as the vehicle driver, cannot perform a manual manipulation of the actuator on account of a distance from the actuating element of the actuating mechanism.

The device according to the invention is not distinguished, however, merely by the fact that two different devices are provided for generating an adjustment movement as required, but rather, in particular, by way of the interaction of said two devices. It is provided in this context that the actuating mechanism can have two operating states, namely a first state, in which the lever arm of the actuating element is fixed relative to a housing of the air vent, and a second state, in which the lever arm of the actuating element can be moved, in particular can be pivoted or rotated about an axis of rotation, relative to the housing of the air vent, in order to generate a corresponding adjustment movement which is to be transmitted to the actuator of the air vent.

In the second state of the actuating mechanism, that is to say when the lever arm of the actuating element can be moved, in particular can be pivoted or rotated, relative to the housing of the air vent, the manual actuation of the actuating element is released according to the invention. According to the invention, this is achieved by virtue of the fact that the frictional force which is necessary in order to achieve a transmission of movement, for example, from the finger of the user to the actuating element at the same time releases the lock counter to the force of a prestressed spring.

It can be provided here that, above all in the first state of the actuating mechanism, that is to say when the lever arm of the actuating element is fixed relative to the housing of the air vent, the motor drive of the drive mechanism is activated or can be activated as required, in order to generate a corresponding adjustment movement which acts on the actuator.

Furthermore, it can be provided according to embodiments of the present invention that, in the second state of the actuating mechanism, the drive element of the motor drive is operatively decoupled from the lever arm of the actuating element in such a manner that no or substantially no adjustment movements generated by the lever arm of the actuating element can be transmitted to the drive element of the motor drive. It can be provided in the same way that, in the first state of the actuating mechanism, the lever arm of the actuating element is fixed in such a way that the actuating element is not moved by way of forces which are transmitted from the drive element of the motor drive to the actuating element.

The advantages which can be achieved by way of said embodiment of the solution according to the invention are obvious: by way of the above-described operative decoupling of the actuating mechanism and the drive mechanism in the first and second state of the actuating mechanism, the device for manipulating the actuator which is designed, in particular, in the form of a throttle flap or closure flap has a type of "setting memory" with regard to a setting of the actuating element, which setting was last selected manually in the second state of the actuating mechanism, if the actuator of the air vent has been manipulated in the first state of the actuating mechanism via the drive mechanism or the motor drive of the drive mechanism. In other words, if the actuator of the air vent has been adjusted into a defined position in the second state of the actuating mechanism via the preferably manually actuable actuating element, in order, for example, to throttle the air quantity which is output per unit time by the air vent into the vehicle interior compartment, said state of the actuator is then assumed again after the position of the actuator has been adjusted by motor in the meantime by way of the drive mechanism, to be precise without an electronic detection means and/or storing of said position of the actuator being necessary for this purpose.

This allows, in particular, the conditions of the air vent which are set, for example, by a front seat passenger (for example, the air quantity which is blown out per unit time, the air outflow direction, the temperature of the ejected air, etc.) to be set automatically again even after, in the first state of the actuating mechanism, the corresponding outflow conditions of the air vent have been changed by way of motorized manipulation of the actuator. In this way, the outflow conditions which were originally set by the front seat passenger are again present as soon as the motor drive of the drive mechanism returns into its starting position again.

In this way, it is possible that the air vents which are not required because, for example, no vehicle occupant is situated in the region of the air vent can be deactivated during operation of the vehicle. Secondly, the previously set conditions of the air vent are assumed again as soon as a vehicle occupant is situated in the region of the air vent.

Therefore, the present invention allows the air vents of a vehicle to be activated or deactivated in a manner which is dependent, for example, on the question as to whether a vehicle occupant is situated in the region of the air vent, with the result that, in particular when no vehicle occupant is situated in the region of a corresponding air vent, the energy which would otherwise be required for operating the air vent can be saved.

In a first operating state of the device, a position of the actuator relative to the housing of the air vent can be adjusted, in particular, manually via the actuating element, wherein every position of the actuator corresponds in said first operating state of the device to a defined position of the actuating element.

Secondly, in a second operating state of the device, a position of the actuating element is fixed, which position is set, in particular, in the first operating state of the device. Furthermore, a position of the actuator, which position corresponds to the fixed position of the actuating element in the first operating state of the device, can be adjusted relative to the housing of the air vent in a motorized manner via the drive mechanism.

Here, the device is designed as required to again reverse a position of the actuator which was adjusted in a motorized manner in the second operating state of the device in such a way that the actuator is again in the position which corresponds to that position of the actuating element which was fixed in the first operating state of the device.

To this end, it is conceivable that the drive mechanism has a first stop which is assigned to the drive element of the motor drive, and preferably a further second stop which is likewise assigned to the drive element of the motor drive, in order to limit a movement of the drive element which is assigned to the motor drive.

Here, in a starting position of the device, that is to say before an actuation of the motor drive, the drive element of the motor drive bears against the first stop, wherein the drive element of the motor drive no longer bears against the first stop if the position of the actuator has been adjusted relative to the housing of the air vent in a motorized manner via the drive mechanism. In order to again reverse a position of the actuator, which position is adjusted by motor, the drive element of the motor drive is manipulated in a motorized manner in such a way that it again bears against the first stop.

Different embodiments may be suitable for the actuating mechanism, by way of which the actuator can be adjusted by way of, in particular, manual actuation of the actuating element. Although it is conceivable to design the actuating mechanism in a purely electronic manner by way of the provision of a corresponding circuit and sensor system, it is advantageous if purely mechanical solutions are used, in particular solutions which are based on the principle of a centrifugal coupling or slip coupling.

According to advantageous embodiments of the present invention, the actuating mechanism has a first coupling element and a second coupling element, which coupling elements are operatively connected in the first state of the actuating mechanism, wherein, in the second state of the actuating mechanism, an operative connection between the first and the second coupling element is released.

It is conceivable in this context, for example, if the first coupling element is fixedly connected to the housing of the air vent and is preferably designed as a bearing pin with a toothed region, wherein, in the first state of the actuating mechanism, the second coupling element is fixed relative to the first coupling element and, in the second state of the actuating mechanism, the second coupling element is pivotable or rotatable relative to the first coupling element about the axis of rotation of the lever arm of the actuating element.

Here, the second coupling element preferably has a toothed region which, only in the first state of the actuating mechanism, is in engagement with the toothed region of the first coupling element, which is preferably designed as a bearing pin.

It goes without saying, however, that other realizations may be suitable for the actuating mechanism.

In an advantageous way, the actuating mechanism has an elastic prestressing element, in particular in the form of a spring, for prestressing the first coupling element in such a manner that the latter is operatively connected to the second coupling element when no actuating force or no sufficient actuating force acting in the opposite direction to the prestressing force generated by the prestressing element is transmitted to the second coupling element via the actuating element.

In order to achieve a situation where, in the case of actuation of the actuating element, the actuator of the air vent can be manipulated after a predictable sequence of events, it is provided according to embodiments of the device according to the invention that the lever arm of the actuating element is assigned a first stop and preferably a further, second stop, in order to limit a movement and, in particular, a pivoting of rotational movement of the lever arm in the second state of the actuating mechanism.

In order for it to be possible for the adjustment movement which is generated either by the actuating mechanism or the drive mechanism as required to be transmitted to the actuator of the air vent, which actuator is to be manipulated, a coupling mechanism with at least one force transmission element is provided in an advantageous way, wherein said force transmission element is preferably one or at least one coupling rod. The at least one force transmission element of the coupling mechanism serves to transmit as required a movement which is possibly generated by the motor drive or the correspondingly assigned drive element to that actuator of the air vent which is possibly to be manipulated, and to transmit as required a movement which is possibly generated by the actuating element or the correspondingly assigned lever arm in the second state of the actuating mechanism to that actuator of the air vent which is possibly to be manipulated.

According to preferred embodiments of the device according to the invention, the at least one force transmission element is part of a toggle lever system which belongs to the coupling mechanism and has a first supporting lever and a second supporting lever. Here, the first supporting lever of the toggle lever system is connected in an articulated manner to the actuating element or the correspondingly assigned lever arm of the actuating mechanism. The second supporting lever of the toggle lever system is connected in an articulated manner to that actuator of the air vent which is to be manipulated or to a correspondingly assigned lever arm of the actuator. Here, the first and second supporting lever are connected to one another in an articulated manner with the configuration of a toggle region.

In an advantageous way, the toggle lever system of the coupling mechanism furthermore has a third supporting lever which, firstly, is connected in an articulated manner preferably in the toggle region to the first and second supporting lever and, secondly, is connected in an articulated manner to the drive element which is assigned to the motor drive. Here, the drive element which is assigned to the motor drive is preferably designed as a drive lever.

As an alternative to this, it is also conceivable, however, if the toggle lever system of the coupling mechanism has a third supporting lever which, firstly, is connected in an articulated manner preferably in the toggle region to the first and second supporting lever and, secondly, is connected to the drive element, which is assigned to the motor drive, in such a manner that, when the motor drive is actuated in the first state of the actuating mechanism, the third supporting lever is movable relative to the housing of the air vent in a pure linear movement.

It is conceivable in this context, for example, if the third supporting lever is designed at least in regions as a rack, wherein the drive element assigned to the motor drive has a toothed region or is designed as a gearwheel and is in engagement with the supporting lever, which is designed at least in regions as a rack.

Instead of a toggle lever system, the coupling mechanism of the device according to the invention can also have a coupling rod which, firstly, is connected in an articulated manner to the lever arm which is assigned to the actuating element and, secondly, is connected in an articulated manner to a lever arm which is assigned to the actuator, wherein the lever arm which is assigned to the actuator can be rotated or pivoted relative to the housing of the air vent about an axis of rotation, and wherein the lever arm which is assigned to the actuator is operatively connected to the actuator and the drive element which is assigned to the motor drive in such a way that, in the case of pivoting or rotating of the lever arm of the actuating element about the corresponding axis of rotation, the lever arm which is assigned to the actuator and the actuator itself are also rotated via the coupling rod of the coupling mechanism, whereas no or substantially no movement which is generated by the lever arm which is assigned to the actuating element is transmitted to the drive element of the motor drive.

Secondly, the lever arm which is assigned to the actuator is operatively connected to the actuator and the drive element which is assigned to the motor drive in such a way that, in the case of actuation of the motor drive, a movement which is generated by the drive element of the motor drive is transmitted to the actuator, whereas, however, no or substantially no movement which is generated by the drive element which is assigned to the motor drive is transmitted to the lever arm which is assigned to the actuator.

An operative connection of this type from the lever arm which is assigned to the actuator to the actuator and the drive element which is assigned to the motor drive is possible, for example, by way of the use of a planetary gearing or differential gearing, wherein a planetary gearing or differential gearing of this type operatively connects the lever arm which is assigned to the actuator to the drive element of the motor drive and to the actuator.

With regard to the embodiments, in the case of which the coupling mechanism has a toggle lever system, it is advantageous if, in that state of the actuator which is closed by motor, the first and second supporting lever of the toggle lever system are in an at least substantially extended or overextended position.

Finally, it is preferably provided if the drive mechanism has a first stop assigned to the drive element of the motor drive and preferably a further, second stop, which is assigned to the drive element of the motor drive, for limiting a movement of the drive element, which is assigned to the motor drive, in the first state of the actuating mechanism. In a state, in which the drive element lies against the first stop, the actuator of the air vent should be in a position which corresponds to the position of the adjusting wheel, wherein the elastic stop of the sealing lips of the actuator on the housing limits the movement of the electric drive in the other direction.

In a state, in which the actuating element is situated in the "open" position, the second stop can serve as an overload protection means for the seals, or can prevent crossing in the case of a toggle lever between the first and second supporting levers.

BRIEF DESCRIPTION OF THE DRAWINGS

In the following text, exemplary embodiments of the invention will be described in greater detail with reference to the appended drawings.

In the drawings.

DETAILED DESCRIPTION

Figure 1:
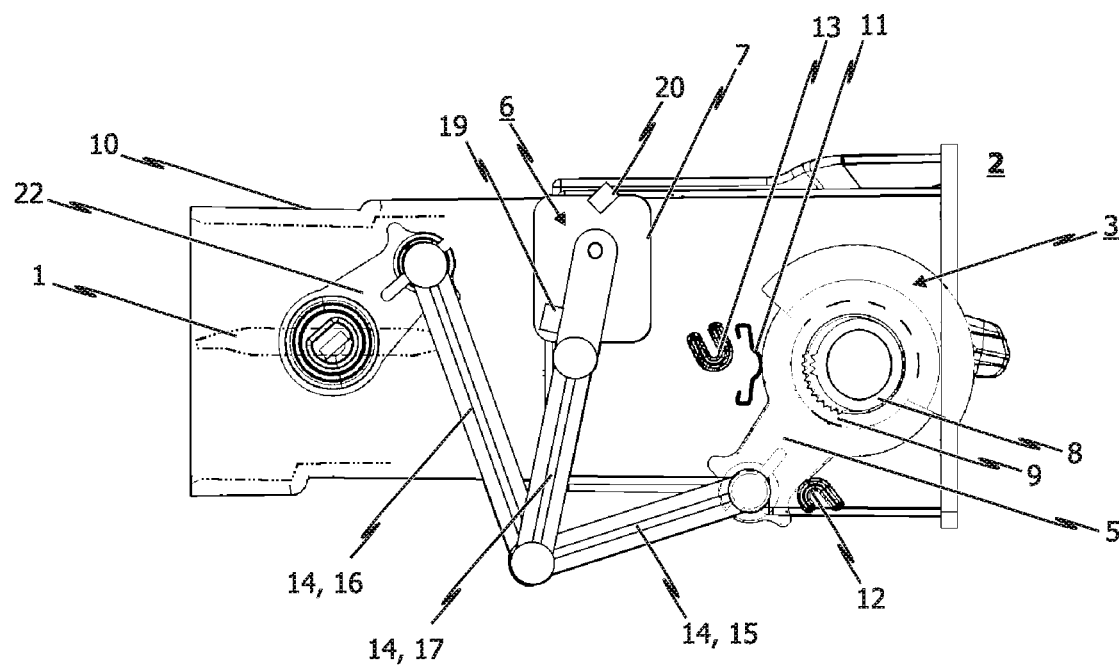
FIG. 1 shows, diagrammatically and in a partially sectioned view, a first exemplary embodiment of an air vent with a device for manipulating an actuator of the air vent in a state, in which the actuating mechanism of the device is being pressed by a finger of an operator for the purpose of actuation, and the actuator is in a completely open state.

In the following text, a first exemplary embodiment of the device according to the invention will first of all be described in greater detail with reference to FIGS. 1 to 3.

The device according to the invention serves to manipulate an actuator 1 of an air vent 2. To this end, the device has a manually actuable actuating element 3, wherein said actuating element 3 is assigned a lever arm 5, in order to generate a corresponding movement manually and as required, for manipulating the actuator 1 of the air vent 2.

Moreover, the device according to the invention has a drive mechanism 6 with a motor drive 7, wherein said motor drive 7 is preferably an electric motor drive 7. The motor drive 7 is assigned a drive element, via which a corresponding movement which serves to manipulate the actuator 1 of the air vent 2 is generated as required.

The actuating mechanism with the preferably manually actuable actuating element 3 has substantially two operating states. In a first state, as shown in FIG. 3, for example, the lever arm 5 of the actuating element 3 is fixed relative to a housing 10 of the air vent 2. Secondly, in said first state of the actuating mechanism, the lever arm 5 is operatively decoupled from the drive element of the motor drive 7 in such a way that no or at least substantially no movements which are generated by the drive element of the motor drive 7 can be transmitted to the actuating element 3 (and vice versa).

Figure 2:
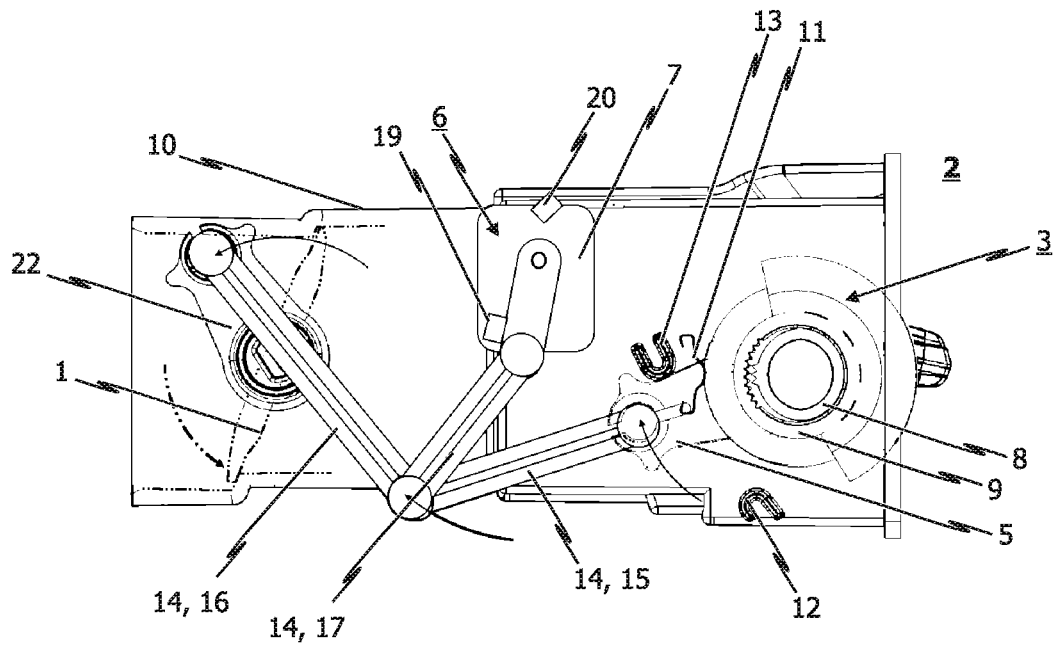
FIG. 2 shows, diagrammatically and in a partially sectioned view, the first exemplary embodiment of the air vent, wherein the actuating mechanism is still being pressed by a finger of the operator for the purpose of actuation, and the actuator is in a completely closed state.

In a second state of the actuating mechanism, as shown in FIG. 1 or FIG. 2, for example, the lever arm 5 of the actuating element 3 can be pivoted or rotated relative to the housing 10 of the air vent 2 about an axis of rotation, in order in this way to generate a corresponding movement which serves to manipulate the actuator 1 of the air vent 2.

Here, the motor drive 7 is activated, above all, in the first state of the actuating mechanism when, for example, the passenger exits or enters and is therefore so occupied that he/she does not or cannot actuate the actuating element 3 at the same time.

In the second state of the actuating mechanism (cf. FIG. 1 and FIG. 2), the drive element of the motor drive 7 is operatively decoupled from the lever arm 5 of the actuating element 3 in such a way that no or at least substantially no adjustment movements which are generated by the lever arm 5 of the actuating element 3 can be transmitted to the drive element of the motor drive 7 (and vice versa).

It is a common feature of all the embodiments shown in the figures of the device according to the invention for manipulating the actuator 1 of the air vent 2 that the actuating mechanism has a first coupling element 8 and a second coupling element 9, wherein said coupling elements 8, 9 are operatively connected in the first state of the actuating mechanism, wherein an operative connection between the first and the second coupling element 8, 9 is released in the second state of the actuating mechanism.

In detail, in the case of the exemplary embodiments which are shown in the drawings, this is achieved by virtue of the fact that the first coupling element 8 is connected fixedly to the housing 10 of the air vent 2 and is preferably configured as a bearing journal with a toothed region, wherein the second coupling element 9 is fixed relative to the first coupling element 8 in the first state of the actuating mechanism, and wherein, in the second state of the actuating mechanism, the second coupling element 9 can be pivoted or rotated relative to the first coupling element 8 about the axis of rotation of the lever arm 5 of the actuating element 3.

The second coupling element 9 preferably also has a toothed region which is in engagement with the toothed region of the first coupling element 8 which is preferably configured as a bearing journal only in the first state of the actuating mechanism.

In the case of the embodiments of the actuating mechanism which are shown in the drawings, furthermore, an elastic prestressing element in the form of a spring 11 is used, in order to prestress the first coupling element 8 in such a way that it is operatively connected to the second coupling element 9 when no or no sufficient actuating force which acts in the opposite direction to the prestressing force which is generated by way of the prestressing element is transmitted via the actuating element 3 to the second coupling element 9.

Moreover, it is a common feature of all the embodiments which are shown in the drawings that the lever arm 5 of the actuating element 3 is assigned a first stop 12 and, furthermore, a second stop 13, in order to limit a pivoting of rotational movement of the lever arm 5 in the second state of the actuating mechanism.

Furthermore, it is a common feature of the exemplary embodiments that, in a first operating state of the device, such as in a starting position of the device, for example, a position of the actuator 1 relative to the housing 10 of the air vent 2 can be adjusted manually via the actuating element 3, wherein, in said first operating state of the device, each position of the actuator 1 corresponds to a defined position of the actuating element 3.

In a second operating state of the device, a position of the actuating element 3 is fixed, which position is set, in particular, in the first operating state of the device, and a position of the actuator 1 relative to the housing 10 of the air vent 2 can be adjusted (only) in a motorized manner via the drive mechanism 6.

Here, the device is configured to reverse a position of the actuator 1 again as required, which position is adjusted by motor in the second operating state of the device, in such a way that the actuator 1 is then in the position again which corresponds to that position of the actuating element 3 which is fixed in the first operating state of the device.

For this purpose, the drive mechanism has the first stop 19 which is assigned to the drive element of the motor drive 7. Here, in the first operating state of the device, the drive element of the motor drive 7 lies against the first stop 19, wherein the drive element of the motor drive 7 no longer lies against the first stop 19 when, in the second operating state of the device, the position of the actuator 1 is adjusted by motor via the drive mechanism 6 relative to the housing 10 of the air vent 2. In order to reverse a position of the actuator 1, which position is adjusted by motor in the second operating state of the device, the drive element of the motor drive 7 is manipulated in such a way that it again lies against the first stop 19.

In order to transmit an adjustment movement which is generated by the actuating mechanism or the drive mechanism 6 to the actuator 1 to be manipulated of the air vent 2, a coupling mechanism with at least one force transmission element is used in the case of those embodiments of the device according to the invention which are shown diagrammatically in the drawings, wherein said at least one force transmission element is preferably designed in the form of a coupling rod.

In the case of the first and second embodiment of the device according to the invention according to FIGS. 1 to 5, it is provided in detail that the coupling mechanism has a toggle lever system, wherein said toggle lever system comprises a first supporting lever 15 and a second supporting lever 16. The first supporting lever 15 is connected in an articulated manner to the lever arm 5, whereas the second supporting lever 16 is connected in an articulated manner to the actuator 1 to be manipulated of the air vent 2 or to a correspondingly assigned lever arm 22 of the actuator 1. Furthermore, the first and second supporting lever 15, 16 are connected to one another in an articulated manner with the configuration of a toggle region.

Figure 3:
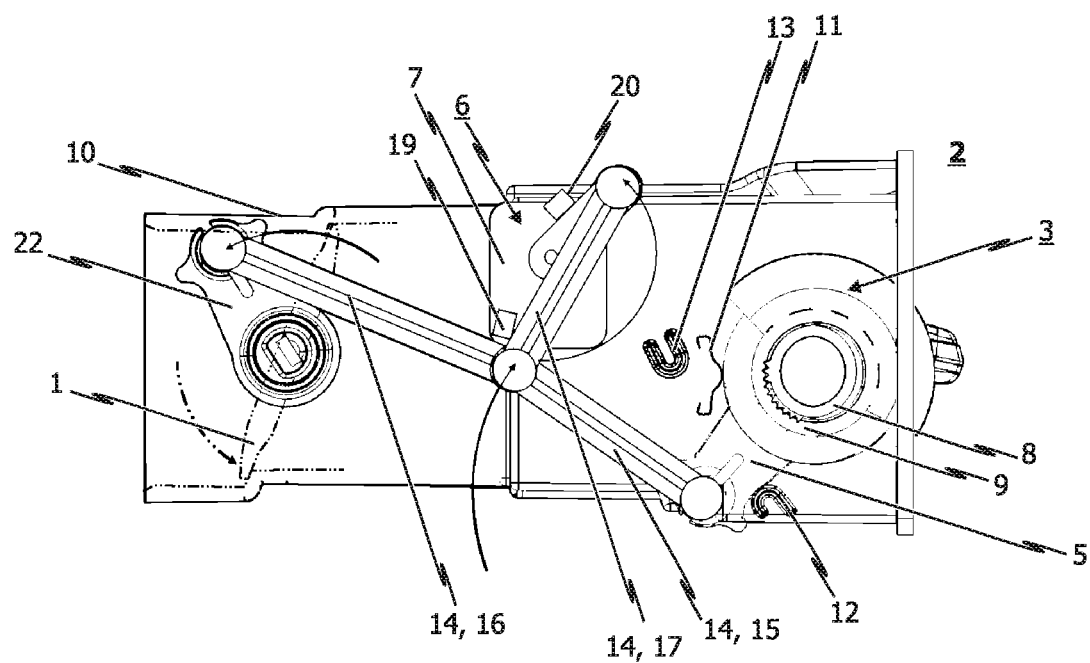
FIG. 3 shows, diagrammatically and in a partially sectioned view, the first exemplary embodiment of the air vent, wherein the actuating mechanism is non-actuated or untouched, and the electric drive has already moved the actuator from a completely open state into a completely closed state.

Furthermore, the coupling mechanism according to the first exemplary embodiment, as shown diagrammatically in FIGS. 1 to 3, has a third supporting lever 17 which is connected firstly preferably in the toggle region in an articulated manner to the first and second supporting lever 15, 16, and secondly in an articulated manner to the drive element which is assigned to the motor drive 7. Here, the drive element which is assigned to the motor drive 7 is preferably configured as a drive lever.

Figure 4:
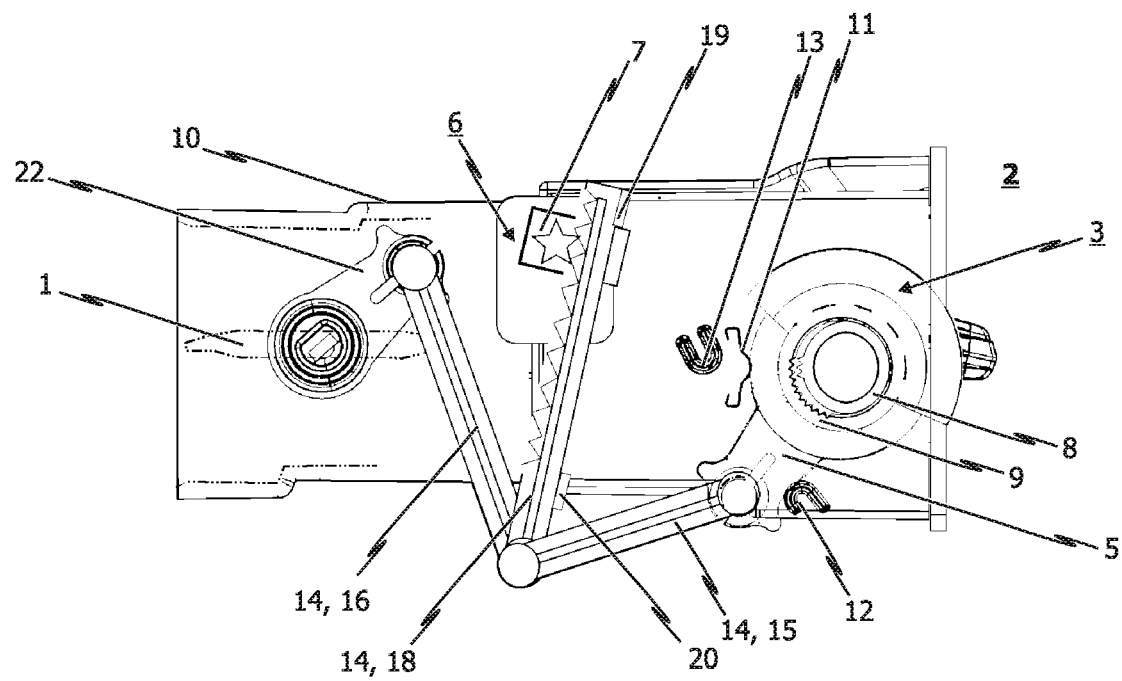
FIG. 4 shows, diagrammatically and in a partially sectioned view, a second exemplary embodiment of an air vent with a device for manipulating an actuator of the air vent in a state, in which the actuating mechanism of the device is being pressed by a finger of the operator for the purpose of actuation, and the actuator is in a completely open state.
Figure 5:
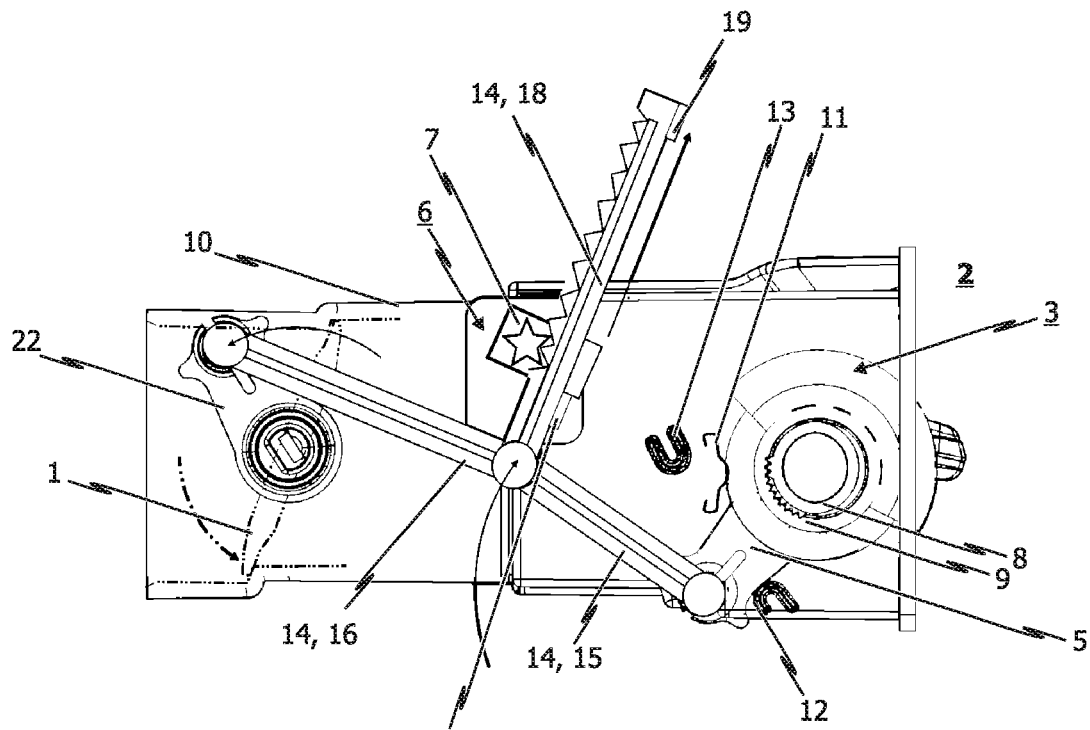
FIG. 5 shows, diagrammatically and in a partially sectioned view, the second exemplary embodiment of the air vent, wherein the actuating mechanism is non-actuated or untouched, and the electric drive has already moved the actuator from a completely open state into a completely closed state.

In contrast to this, it is provided in the case of the second exemplary embodiment of the device according to the invention according to FIGS. 4 and 5 that the coupling mechanism has a third supporting lever 18 which is connected firstly preferably in the toggle region in an articulated manner to the first and second supporting lever 15, 16, and secondly to the drive element which is assigned to the motor drive 7, in such a way that, in the case of actuation of the motor drive 7 in the first state of the actuating mechanism, the third supporting lever 18 can be moved in a preferably pure linear movement relative to the housing 10 of the air vent 2.

As indicated in FIGS. 4 and 5, the third supporting lever 18 can be configured at least in regions as a rack, wherein the drive element which is assigned to the motor drive 7 has a corresponding toothed region or is configured as a gearwheel and is in engagement with the third supporting lever 18 which is configured at least in regions as a rack.

It is provided in the case of the first and the second exemplary embodiment of the device according to the invention that, in that state of the actuator 1 in which it is closed by motor, the first and second supporting lever 15, 16 of the toggle lever system are in an at least substantially extended or overextended position.

In this way, a relatively small torque which is to be applied by way of the motor drive 7 is already sufficient to lead to a sufficiently high actuating force, in particular closing force, which acts on the actuator 1. On account of the lever action of the toggle lever system, the motor drive 7 therefore has to apply a small torque, in order to apply a sufficiently high closing force which acts on the actuator 1. In this way, a motor drive 7, in particular an electric motor, with a low power output capability and therefore also with a small installation space requirement can be used.

Figure 6:
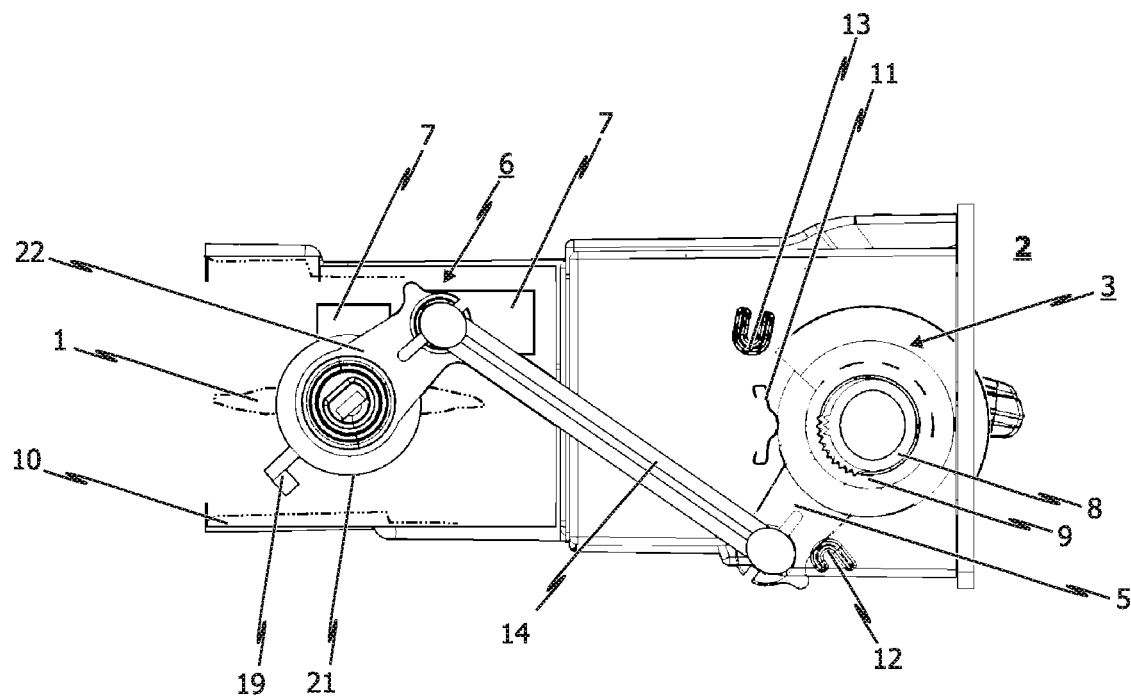
FIG. 6 shows, diagrammatically and in a partially sectioned view, a third exemplary embodiment of an air vent with a device for manipulating an actuator of the air vent in a state, in which the actuating mechanism of the device is being pressed by a finger of the operator for the purpose of actuation, and the actuator is in a completely open state.
Figure 7:
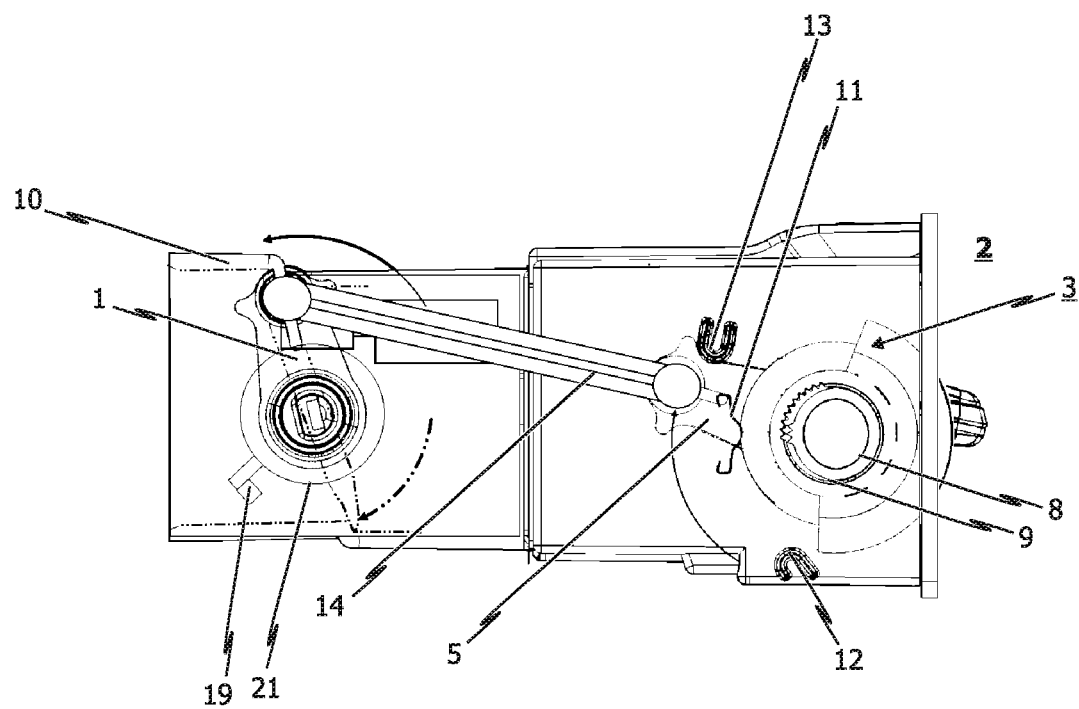
FIG. 7 shows, diagrammatically and in a partially sectioned view, the third exemplary embodiment of the air vent, wherein the actuating mechanism is still being pressed by a finger of the operator for the purpose of actuation, and the actuator is in a completely closed state.
Figure 8:
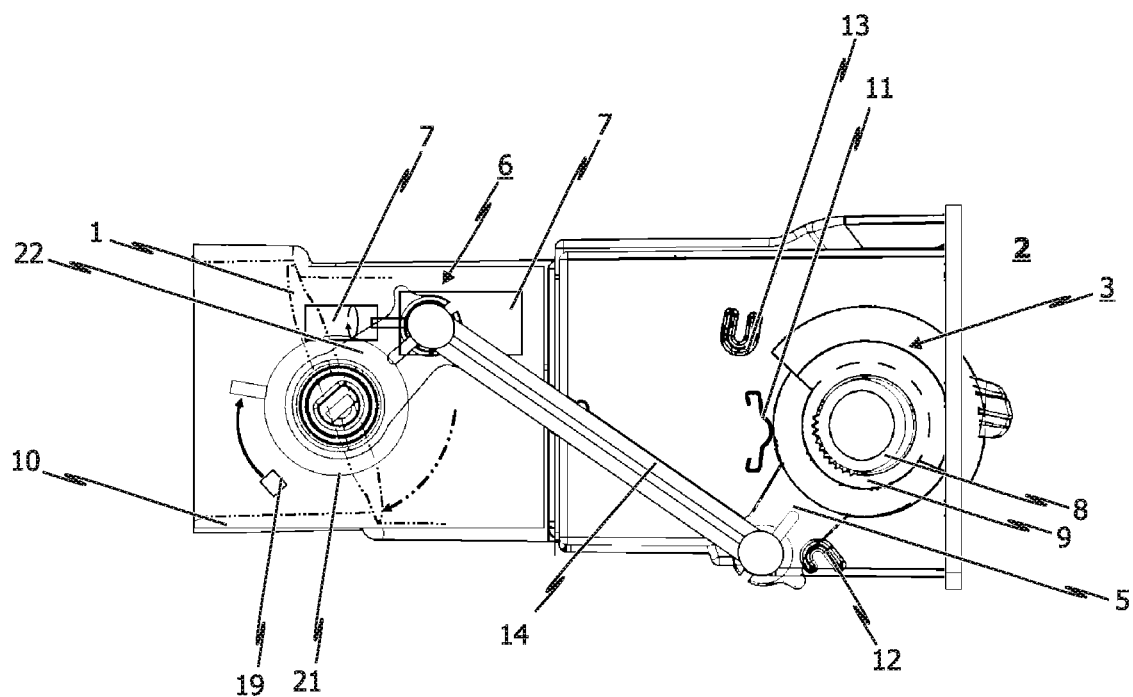
FIG. 8 shows, diagrammatically and in a partially sectioned view, the third exemplary embodiment of the air vent, wherein the actuating mechanism is non-actuated or untouched, and the electric drive has already moved the actuator from a completely open state into a completely closed state.

In contrast to the first and the second exemplary embodiment of the device according to the invention, in the case of the third exemplary embodiment of the device according to the invention according to FIG. 6 to FIG. 8, the coupling mechanism has a coupling rod 14 which is connected firstly in an articulated manner to the lever arm 5 which is assigned to the actuating element 3, and secondly in an articulated manner to a lever arm 22 which is assigned to the actuator 1.

A lever arm 22 which is assigned to the actuator 1 can be rotated or pivoted relative to the housing 10 of the air vent 2 about an axis of rotation, and is operatively connected to the actuator 1 or the drive element which is assigned to the motor drive 7, in such a way that, in the case of pivoting or rotating of the lever arm 5 of the actuating element 3 about the corresponding axis of rotation, the lever arm 22 which is assigned to the actuator 1 and the actuator 1 itself are also rotated via the coupling rod 14 of the coupling mechanism, whereas no or substantially no movements which are generated by the lever arm 5 which is assigned to the actuating element 3 are transmitted to the drive element of the motor drive 7.

Secondly, the lever arm 22 which is assigned to the actuator 1 is operatively coupled to the actuator 1 and the drive element which is assigned to the motor drive 7 in such a way that, in the case of an actuation of the motor drive 7, adjustment movements which are generated by the drive element of the motor drive 7 are transmitted to the actuator 1, whereas no or substantially no adjustment movements which are generated by the drive element which is assigned to the motor drive 7 are transmitted to the lever arm 22 which is assigned to the actuator 1.

It is appropriate for this purpose, in particular, if the coupling mechanism has a planetary or differential gearing 21, via which the lever arm 22 which is assigned to the actuator 1 is operatively connected to the drive element of the motor drive 7 and to the actuator 1.

It is a common feature of all of the exemplary embodiments of the device according to the invention which are shown in the drawings that the drive mechanism 6 has a first stop 19 which is assigned to the drive element of the motor drive 7, and preferably a further second stop 20 which is assigned to the drive element of the motor drive 7, in order to limit a movement of the drive element which is assigned to the motor drive 7 in the motor-operated state.

It is provided here, in particular, that, in a state in which the drive element lies against the first stop 19, the actuator 1 of the air vent 2 is in a position which corresponds to the position of the actuating element 3, wherein, in a state in which the drive element lies against the second stop 20, the actuator 1 of the air vent 2 is in a second and preferably completely closed state.

Summarized briefly, the method of operation of the device according to the invention can therefore be described as follows:

In the case of a manual actuation, the operator presses with his/her finger onto the manually actuable actuating element 3 which, in the case of the exemplary embodiments which are shown in the drawings, is configured as a thumb wheel. As a result, the actuating element 3 moves counter to the force of the spring 11 which is configured, in particular, as a leaf spring to such an extent (to the left in the drawings) that a toothing engagement with respect to the housing 10 of the air vent 2 is released and the actuating element 3 no longer has a locking or retaining action.

In the case of a motorized movement of the actuator 1 with the aid of the electric motor drive 7, in contrast, the spring 11 again ensures an engagement of the toothing, with the result that the actuating element 3 (thumb wheel) does not move despite the reaction force in the coupling rod 14, via which the actuating element 3 is connected to the electric motor drive 7 or the actuator 1.

In the case of the first and second exemplary embodiment of the present invention, the movement of the finger is transmitted from the actuating element 3 to the coupling rod 15. The latter rotates the other coupling rod 17 about the articulation point on a lever of the electric motor drive 7 (see first exemplary embodiment) or about the axis of the electric motor drive 7 with the gearwheel (as a replacement for the lever) in the case of the second exemplary embodiment. As a result, the movement is transmitted further to the other coupling rod 16 which manipulates (opens or closes) the actuator 1 of the air vent 2.

In the case of motorized closing, the electric motor drive 7 raises the coupling rod via a lever or gearwheel, with the result that the coupling rods 15 and 16 move into an extended position and, as a result, the actuator 1 is closed. In the case of a force rise by way of the actuator 1 lying against the housing 10, the electric motor drive 7 remains at a standstill.

If the original manually set position of the actuator 1 is to be re-established in a motorized manner, the electric motor drive 7 moves in the other direction until the lever of the electric motor drive 7 or the coupling rod 17 lies against the end stop 19. Since the manually actuable actuating element 3 (thumb wheel) does not change its position with respect to the housing 10 in the process thanks to the leaf spring 11 and the toothing, the original state is re-established.

In the case of the third exemplary embodiment, the lever 22 can be rotated on the axis of rotation of the actuator 1. A planetary gearing or a differential gearing is used between the actuator 1 and the lever 22, which planetary gearing or differential gearing superimposes an adjustment movement by the actuating element 3 (thumb wheel) and the electric motor drive 7 in an analogous manner with respect to the first and second exemplary embodiment.

In the case of a stationary electric motor drive 7, the actuating element 3 (thumb wheel) transmits the movement to the lever 22, and the latter transmits it via the planetary or differential gearing to the actuator 1 of the air vent 2.

In the case of a motorized actuation, the actuating element 3 (thumb wheel) and therefore the lever 22 are at a standstill. The electric motor drive 7 drives the planetary or differential gearing via the gearwheel, and said planetary or differential gearing rotates the actuator 1 of the air vent 2.

Here, during closing (in precisely the same way as in the case of the first and second exemplary embodiment), the electric motor drive 7 rotates the actuator 1, to be precise independently of the position of the actuating element 3 (thumb wheel), as far as the torque increase when the actuator 1 lies in a closed manner against the housing 10 of the air vent 2.

In the case of the re-establishing of the old position, that is to say that position of the actuator 1 which was previously set (manually) with the aid of the actuating element 3, the electric motor drive 7 moves backward until a lug lies against the end stop 19, and therefore the position/location of the actuator 1 relative to the housing 10 of the air vent 2 corresponds again to the position of the actuating element 3 (thumb wheel).

In summary, it remains to be noted that the solution according to the invention is distinguished, in particular, by the fact that a restoring mechanism is provided which makes a superimposition possible of a transmission of an adjustment movement which is generated by the actuating element 3 to the actuator 1 with an adjustment movement which is generated by the motor drive 7, wherein, in said state, a rotation of the actuating element 3 or, more generally, an adjustment of the actuating element 3 is prevented.

The invention is not restricted to the exemplary embodiments which are shown in the drawings, but rather results from a synopsis of all features which are disclosed herein.

It is thus conceivable, for example, that the actuating mechanism is configured as a spring coupling which has at least one first coupling element, a second coupling element and a spring, wherein said spring can be, for example, a leg spring.

It is also conceivable that a corresponding sensor system is provided for detecting the position of the actuator 1 which can be manipulated of the air vent 2, the lever arm 5 of the preferably manually actuable actuating element 3 and/or the drive element of the motor drive 7. Detecting of this type of the position can take place by way of generally known means, wherein recourse is made to tried and tested components.

As an alternative or in addition to this, it is conceivable that the actuator 1 to be manipulated of the air vent 2 is part of a fan louvre. Here, the individual flaps of the fan louvre can be connected in a structurally particularly simple manner by way of a coupling rod.

Furthermore, it is conceivable that the device according to the invention is assigned an indicator device, in particular in the form of a mechanical display, an indicator bar or a display, in order to accordingly indicate that position of the actuator 1 which is set manually via the actuating element 3 and/or the actually set position of the actuator 1. In this context, it is conceivable, for example, that optionally either that setting of the actuator 1 which is selected manually via the actuating element 3 or the actually set position of the actuator 1 is indicated. It is also conceivable if, at the same time (for example, via two different indicators), both that position of the actuator 1 which is selected manually via the actuating element 3 and the actually set position of the actuator 1 are indicated.

Here, the indicator device can be coupled mechanically, for example, to the lever arm 22 of the actuator 1, in order to correspondingly indicate an actually set position of the actuator 1 visually to the vehicle occupant. In addition or as an alternative to this, the indicator device can be coupled mechanically, for example, to the lever arm 5 of the actuating element 3, in order to correspondingly indicate a position of the actuator visually to the vehicle occupant, which position is selected manually via the actuating element 3.

As an alternative to this, however, it is also conceivable if an actually set position of the actuator 1 is detected with the aid of a position sensor and is indicated visually via the indicator device. The same also applies to that position of the actuator which is selected manually via the actuating element 3, which can likewise be detected with the aid of a suitable position sensor.

In summary, it remains to be noted that the device according to the invention makes a combined manual and, in particular, electric actuation of actuators, in particular closure flaps, in air vents possible. In particular, the device according to the invention serves to allow actuators, such as closure flaps, for example, which are to be closed temporarily in an electronic manner, to subsequently return again into the starting position, in order, for example, to minimize the quantity of air to be heated or to be cooled, and therefore to save energy and/or to increase the range, in particular in the case of electric vehicles.

LIST OF DESIGNATIONS

1 Actuator
2 Air vent
3 Actuating element
5 Lever arm of the actuating element
6 Drive mechanism
7 Motor drive
8 First coupling element
9 Second coupling element
10 Housing
11 Spring
12 First stop
13 Second stop
14 Coupling rods/Force transmission elements
15 First supporting lever (toggle lever system)
16 Second supporting lever (toggle lever system)
17 Third supporting lever (toggle lever system)
18 Third supporting lever (toggle lever system)/rack
19 First stop
20 Second stop
21 Planetary/differential gearing
22 Lever arm of the actuator

The invention claimed is:

1. A device for manipulating an actuator, designed in the form of a throttle flap or closure flap, of an air vent, wherein the actuator is designed as an air-guiding element or as part of a package of air-guiding elements, the device comprising:

a manually actuable actuating element which is coupled mechanically to the actuator such that, by actuation of the actuating element, the actuator is adjustable relative to a housing of the air vent; and a drive mechanism with a motor drive, which is coupled mechanically to the actuator such that, by actuation of the motor drive, the actuator is adjustable relative to the housing of the air vent, wherein the drive mechanism is assigned a resetting mechanism which is designed to make an adjustment movement, brought about previously by the motor drive, of the actuator relative to the housing of the air vent reversible again such that the actuator is then again in a position relative to the housing of the air vent that was set previously by actuation of the actuating element;

wherein the actuating element is arranged to remain stationary when the drive mechanism moves the actuator;

wherein the actuator is adjustable relative to the housing of the air vent between a first extreme position, in which, an air duct of the air vent is completely open, and a second extreme position, in which, the air duct of the air vent is completely blocked by the actuator, wherein the actuating element is designed to set the actuator as desired between the first and second extreme positions;

wherein the actuating element is arranged to remain stationary when the drive mechanism moves the actuator between the first and second extreme positions.

2. The device as claimed in claim 1, wherein the motor drive is assigned a drive element which, by actuation of the motor drive, is movable between a first position defined by a first stop and a second position, wherein, in a state when, by actuation of the motor drive, the drive element is in its second position, the actuator is in its second extreme position, and wherein, in a state when the drive element is in its first position, the actuator is present again in a position relative to the housing of the air vent that was set previously by the actuation of the actuating element.

3. The device as claimed in claim 1, wherein the actuating element is assigned a lever arm for generating as required an adjustment movement acting on the actuator, and wherein the motor drive is assigned a drive element for generating as required an adjustment movement acting on the actuator;

wherein the actuating element has a first state in which it is fixed relative to the housing of the air vent, and a second state in which it is pivotable or rotatable, relative to the housing of the air vent for generating an adjustment movement; and wherein, in the first state of the actuating element, the lever arm of the actuating element is operatively decoupled from the drive element of the motor drive such that no movement generated by the drive element of the motor drive can be transmitted to the actuating element.

4. The device as claimed in claim 3, wherein the actuating element has a first coupling element and a second coupling element, which coupling elements are operatively connected in the first state of the actuating element, wherein, in the second state of the actuating element, an operative connection between the first and the second coupling element is released;

wherein the first coupling element is fixedly connected to the housing of the air vent and is designed as a bearing pin with a toothed region; and wherein, in the first state of the actuating element, the second coupling element is fixed relative to the first coupling element and, in the second state of the actuating element, the second coupling element is pivotable or rotatable relative to the first coupling element about the axis of rotation of the lever arm of the actuating element, wherein the second coupling element has a toothed region which, only in the first state of the actuating element, is in engagement with the toothed region of the first coupling element.

5. The device as claimed in claim 4, wherein the actuating element has an elastic prestressing element, in the form of a spring, for prestressing the first coupling element such that the latter is operatively connected to the second coupling element when no actuating force or no sufficient actuating force acting in the opposite direction to the prestressing force generated by the prestressing element is transmitted to the second coupling element via the actuating element.

6. The device as claimed in claim 1, wherein the device has a coupling mechanism for forming as required an operative connection between a lever arm of the actuating element and a drive element of the motor drive with the actuator, wherein the coupling mechanism is designed such that adjustment movements generated successively in time by the actuating element and the drive element of the motor drive are transmitted in an overlapping manner to the actuator.

7. The device as claimed in claim 6, wherein the device has a coupling mechanism with at least one force transmission element in the form of at least one coupling rod for transmitting as required an adjustment movement, which, in the first state of the actuating element, is generated by the motor drive or the correspondingly assigned drive element, to the actuator, which is to be manipulated where appropriate, of the air vent and for transmitting as required an adjustment movement which, in the second state of the actuating element, is generated by the actuating element or the correspondingly assigned lever arm, to the actuator, which is to be manipulated where appropriate, of the air vent.

8. The device as claimed in claim 6, wherein the coupling mechanism has a first supporting lever which is connected in an articulated manner to the lever arm of the actuating element, and a second supporting lever which is connected in an articulated manner to the actuator, which is to be manipulated, of the air vent or to a correspondingly assigned lever arm of the actuator, wherein the first and second supporting levers are connected in an articulated manner to each other in a connecting region of the first and second supporting lever.

9. The device as claimed in claim 8, wherein the coupling mechanism furthermore has a third supporting lever which, firstly, is connected in an articulated manner in the connecting region of the first and second supporting lever to the first and second supporting lever and, secondly, is connected in an articulated manner to the drive element which is assigned to the motor drive and is designed as a drive lever.

10. The device as claimed in claim 6, wherein, in a first operating state of the device, a position of the actuator is adjustable relative to the housing of the air vent manually via the actuating element, wherein, in the first operating state of the device, each position of the actuator corresponds to a certain position of the actuating element, wherein, in a second operating state of the device, a position of the actuating element, which position is set in the first operating state of the device, is fixed, and a position of the actuator, which position corresponds to the fixed position of the actuating element in the first operating state of the device, is adjustable relative to the housing of the air vent by the motor drive, wherein the device is designed to make a position of the actuator, which position is adjusted by the motor drive in the second operating state of the device, reversible again such that the actuator is then again in the position which corresponds to the position of the actuating element that is fixed in the first operating state of the device.

11. The device as claimed in claim 10, wherein the drive mechanism has a first stop assigned to the drive element of the motor drive and a further, second stop, which is likewise assigned to the drive element of the motor drive, for limiting a movement of the drive element, which is assigned to the motor drive, in the first state of the actuating element, wherein, in the first operating state of the device, the drive element of the motor drive lies against the first stop, and wherein the drive element of the motor drive no longer lies against the first stop if, in the second operating state of the device, the position of the actuator is adjusted relative to the housing of the air vent by the motor drive, wherein, for making a position of the actuator, which position is adjusted by the motor drive in the second operating state of the device, reversible, the drive element of the motor drive is manipulated such that it again lies against the first stop.

12. The device as claimed in claim 6, wherein the coupling mechanism has a coupling rod which, firstly, is connected in an articulated manner to the lever arm assigned to the actuating element, and, secondly, is connected in an articulated manner to a lever arm assigned to the actuator, wherein the lever arm assigned to the actuating element is rotatable or pivotable about an axis of rotation relative to the housing of the air vent, and wherein the lever arm which is assigned to the actuator is operatively connected to the actuator and to the drive element, which is assigned to the motor drive, such that, during pivoting or rotating of the lever arm of the actuating element about the corresponding axis of rotation via the coupling rod of the coupling mechanism, the lever arm assigned to the actuator and the actuator itself are rotated at the same time while no movements or substantially no movements generated by the lever arm assigned to the actuating element are transmitted to the drive element of the motor drive, and that movements generated during actuation of the motor drive by the drive element of the motor drive are transmitted to the actuator while no movements or substantially no movements generated by the drive element assigned to the motor drive are transmitted to the lever arm assigned to the actuating element.

13. The device as claimed in claim 12, wherein the coupling mechanism has a planetary gearing or differential gearing via which the lever arm assigned to the actuator is operatively connected to the drive element of the motor drive and/or to the actuator.

14. A ventilation system with at least one air vent which is assigned a device for manipulating an actuator, which is designed in the form of an air-guiding element, wherein the device for manipulating the actuator is a device as claimed in claim 1.

15. A device for manipulating an actuator, in the form of a throttle flap or closure flap, of an air vent, wherein the actuator is configured as an air-guiding element or as part of a package of air-guiding elements, and wherein the device has the following:
a manually actuable actuating element that is coupled mechanically to the actuator such that, by actuation of the actuating element, the actuator is adjustable relative to a housing of the air vent; and
a powered drive mechanism with a motor drive that is coupled mechanically to the actuator such that, by actuation of the drive, the actuator is adjustable relative to the housing of the air vent,
wherein the powered drive mechanism includes a resetting mechanism that is configured to make an adjustment movement, brought about previously by the motor drive, of the actuator relative to the housing of the air vent reversible again, such that the actuator is then again placed in a position relative to the housing of the air vent that was set previously by actuation of the actuating element;
wherein the actuating element is assigned a lever arm for generating as required an adjustment movement acting on the actuator, and wherein the motor drive is assigned a drive element for generating as required an adjustment movement acting on the actuator;
wherein the actuating element has a first state in which it is fixed relative to the housing of the air vent, and a second state in which it is pivotable or rotatable, relative to the housing of the air vent for generating an adjustment movement; and
wherein, in the first state of the actuating element, the lever arm of the actuating element is operatively decoupled from the drive element of the motor drive such that no movement generated by the drive element of the motor drive can be transmitted to the actuating element;
wherein the actuating element has a first coupling element and a second coupling element, which coupling elements are operatively connected in the first state of the actuating element, wherein, in the second state of the actuating element, an operative connection between the first and the second coupling element is released;
wherein the first coupling element is fixedly connected to the housing of the air vent and is designed as a bearing pin with a toothed region; and
wherein, in the first state of the actuating element, the second coupling element is fixed relative to the first coupling element and, in the second state of the actuating element, the second coupling element is pivotable or rotatable relative to the first coupling element about the axis of rotation of the lever arm of the actuating element, wherein the second coupling element has a toothed region which, only in the first state of the actuating element, is in engagement with the toothed region of the first coupling element.

* * * * *

UNITED STATES PATENT AND TRADEMARK OFFICE
CERTIFICATE OF CORRECTION

| | | |
|---|---|---|
| PATENT NO. | : 12,146,680 B2 | Page 1 of 1 |
| APPLICATION NO. | : 17/426964 | |
| DATED | : November 19, 2024 | |
| INVENTOR(S) | : Manfred Groben et al. | |

It is certified that error appears in the above-identified patent and that said Letters Patent is hereby corrected as shown below:

In the Claims

Column 17, Lines 17-19, Claim 1:
"wherein the actuating element is arranged to remain stationary when the drive mechanism moves the actuator;" should be deleted Signed and Sealed this
Twenty-ninth Day of April, 2025

Coke Morgan Stewart
*Acting Director of the United States Patent and Trademark Office*